(12) United States Patent
Deng et al.

(10) Patent No.: US 11,604,848 B2
(45) Date of Patent: Mar. 14, 2023

(54) TECHNOLOGIES FOR CROSS-DEVICE SHARED WEB RESOURCE CACHE

(71) Applicant: Intel Corporation, Santa Clara, CA (US)

(72) Inventors: Pan Deng, Shanghai (CN); Chunyang Dai, Shanghai (CN); Shu Xu, Shanghai (CN); Tianyou Li, Shanghai (CN); Junchao Han, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/844,518

(22) Filed: Jun. 20, 2022

(65) Prior Publication Data

US 2022/0398292 A1 Dec. 15, 2022

Related U.S. Application Data

(63) Continuation of application No. 16/348,409, filed as application No. PCT/CN2016/109151 on Dec. 9, 2016, now abandoned.

(51) Int. Cl.
*G06F 16/957* (2019.01)
*G06F 12/0811* (2016.01)
(Continued)

(52) U.S. Cl.
CPC ........ *G06F 16/9574* (2019.01); *G06F 12/084* (2013.01); *G06F 12/0811* (2013.01); *H04L 67/568* (2022.05)

(58) Field of Classification Search
CPC ............. G06F 16/9574; G06F 12/0811; G06F 12/084; H04L 67/568; H04L 67/2842; H04L 63/101; H04L 67/16
See application file for complete search history.

(56) References Cited

U.S. PATENT DOCUMENTS 6,311,216 B1 10/2001 Smith et al.
6,571,277 B1 5/2003 Daniels-Barnes et al.
(Continued)

FOREIGN PATENT DOCUMENTS

| CN | 104468768 A | 3/2015 |
| CN | 104618430 A | 5/2015 |
| CN | 102843426 A | 11/2015 |

OTHER PUBLICATIONS

Patent Cooperation Treaty "International Search Report and Written Opinion" issued in International Application No. PCT/CN2016/109151, dated Jul. 27, 2017, 7 pages.
(Continued)

*Primary Examiner* — Wing F Chan
*Assistant Examiner* — Billy H Ng
(74) *Attorney, Agent, or Firm* — Hanley, Flight & Zimmerman, LLC

(57) ABSTRACT

Technologies for cross-device shared web resource caching include a client device and a shared cache device. The client device scans for a shared cache device in local proximity to the client device and, in response to the scan, registers with the shared cache device. After registering, the client device requests a cached web resource from the shared cache device. The shared cache device determines whether a cached web resource that matches the request is installed in a shared cache. The shared cache device may determine whether an origin of the request matches the mi gin of the cached web resource. If installed, the shared cache device sends a found response and the cached web resource to the client device. If not installed, the shared cache device sends a not-found response and the client device may request the web resource from a remote web server. Other embodiments are described and claimed.

23 Claims, 6 Drawing Sheets

(51) Int. Cl.
    *G06F 12/084*     (2016.01)
    *H04L 67/568*     (2022.01)

(56) References Cited

U.S. PATENT DOCUMENTS

| | | |
|---|---|---|
| 6,772,214 B1 | 8/2004 | McClain et al. |
| 6,813,633 B2 | 11/2004 | Wong et al. |
| 9,953,052 B1 | 4/2018 | Hill |
| 2002/0004813 A1 | 1/2002 | Agrawal et al. |
| 2004/0068579 A1 | 4/2004 | Marmigere et al. |
| 2014/0095646 A1 | 4/2014 | Chan et al. |
| 2014/0280683 A1 | 9/2014 | Yanagihara et al. |
| 2015/0350342 A1 | 12/2015 | Thorpe et al. |
| 2016/0359998 A1 | 12/2016 | Yanagihara et al. |
| 2018/0234518 A1 | 8/2018 | Zhu et al. |
| 2018/0332099 A1 | 11/2018 | Panzer et al. |

OTHER PUBLICATIONS

United States Patent and Trademark Office "Non-Final Office Action" issued in U.S. Appl. No. 16/348,409, dated Sep. 22, 2020, 8 pages.
United States Patent and Trademark Office "Final Office Action" issued in U.S. Appl. No. 16/348,409, dated May 14, 2021, 24 pages.
United States Patent and Trademark Office "Non-Final Office Action" issued in U.S. Appl. No. 16/348,409, dated Oct. 28, 2021, 9 pages.
United States Patent and Trademark Office "Notice of Allowance" issued in U.S. Appl. No. 16/348,409, dated Mar. 18, 2022, 10 pages.

TECHNOLOGIES FOR CROSS-DEVICE SHARED WEB RESOURCE CACHE

RELATED APPLICATIONS

This patent arises from a continuation of U.S. patent application Ser. No. 16/348,409 entitled "TECHNOLOGIES FOR CROSS-DEVICE SHARED WEB RESOURCE CACHE," and filed on May 8, 2019, which is a national stage entry under 35 USC § 371(b) of International Application No. PCT/CN2016/109151, filed Dec. 9, 2016. This patent claims priority to U.S. patent application Ser. No. 16/348,409, and International Application No. PCT/CN2016/109151. U.S. patent application Ser. No. 16/348,409, and International Application No. PCT/CN2016/109151 are hereby incorporated herein by reference in their entireties.

BACKGROUND

Web browsers are a popular platform for application development for many types of computing devices. The user experience for web applications may be significantly impacted by network conditions including network availability, bandwidth, and/or latency. Typical browsers may provide a single-device or a single-user cache for web resources such as images, scripts, and other remote resources.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
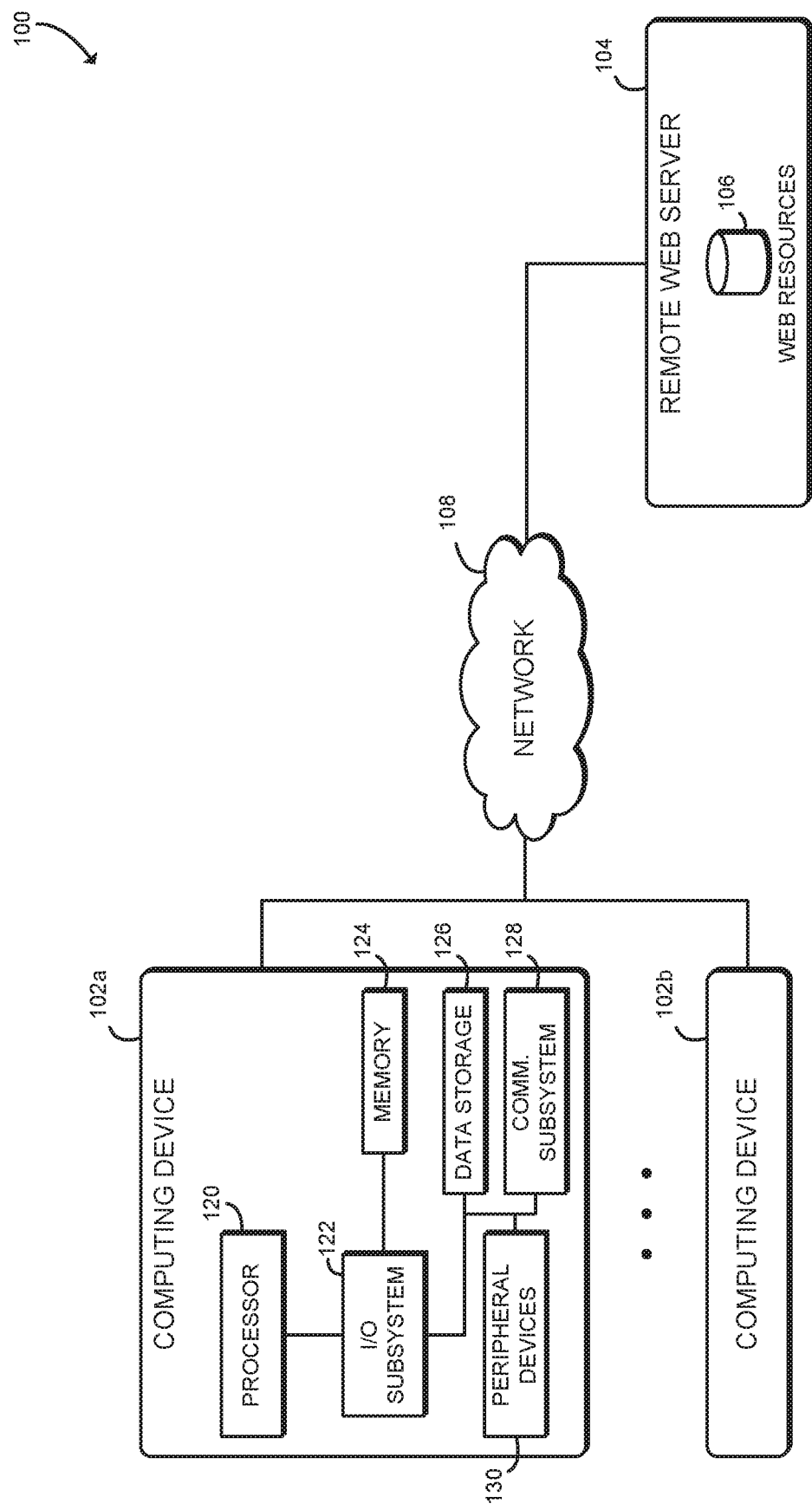
FIG. 1 is a simplified block diagram of at least one embodiment of a system for a cross-device shared web resource cache.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for cross-device web resource caching includes multiple computing devices 102 in communication with one or more remote web servers 104 over a network 108. In use, as described further below, a computing device 102 may search for other, nearby computing devices 102 that provide a shared web cache service. For example, the shared cache may be shared between computing devices 102 on the same local subnetwork or computing devices 102 connected by a short-range communication protocol. A web browser or web application of a shared cache client computing device 102 may determine whether web resources 106 downloaded from a remote web server 104 have been designated as cacheable by the web developer and, if so, install the resource in a shared cache. Web browsers or web applications executed by other computing devices 102 may request and download cached web resources from the shared cache client computing device 102. Thus, the system 100 may enable effective utilization of network resources and avoid contention for network resources by client devices, reduce access latency and network bandwidth requirements, and improve performance and power consumption. Additionally, the system 100 allows web resources to be cached and shared among client devices at the browser level. The system 100 may provide simplicity and flexibility by allowing the web developer and the browser to configure caching, without requiring configuration of proxy servers. Also, web resources may be cached and shared without requiring modification to existing web pages or web applications. The system 100 may also provide an improved offline experience for times when an external network connection is unavailable.

Each computing device 102 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, a computing device 102 illustratively includes a processor 120, an input/output subsystem 122, a memory 124, a data storage device 126, and a communication subsystem 128. Of course, the computing device 102 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 102 may be embodied as any communication circuit, device, or collection thereof, capable of enabling communications between the computing device 102 and other remote devices over a network. The communication subsystem 128 may be configured to use any one or more communication technology (e.g., wired or wireless communications) and associated protocols (e.g., Ethernet, Bluetooth®, Wi-Fi®, WiMAX, etc.) to effect such communication. In particular, in some embodiments, the computing device 102 may be capable of short-range wireless communications with one or more other computing devices 102.

As shown, the computing device 102 may also include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or peripheral devices.

The remote web server 104 may be embodied as any type of computation or computer device capable of performing the functions described herein, including, without limitation, a computer, a multiprocessor system, a server, a rack-mounted server, a blade server, a network appliance, a distributed computing system, a processor-based system, and/or a consumer electronic device. As such, the remote web server 104 may be embodied as a single server computing device or a collection of servers and associated devices. For example, in some embodiments, the remote web server 104 may be embodied as a "virtual server" formed from multiple computing devices distributed across the network 108 and operating in a public or private cloud. Accordingly, although the remote web server 104 is illustrated in FIG. 1 and described below as embodied as a single server computing device, it should be appreciated that the remote web server 104 may be embodied as multiple devices cooperating together to facilitate the functionality described below. The remote web server 104 may include a processor, an I/O subsystem, a memory, a data storage device, a communication subsystem, and/or other components and devices commonly found in a server or similar computing device. Those individual components of the remote web server 104 may be similar to the corresponding components of the computing device 102, the description of which is applicable to the corresponding components of the remote web server 104 and is not repeated herein so as not to obscure the present disclosure.

As discussed in more detail below, the computing device 102 and the remote web server 104 may be configured to transmit and receive data with each other and/or other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), a cellular network, and/or a publicly-accessible, global network such as the Internet or RF network. As such, the network 108 may include any number of additional devices, such as additional computers, routers, and switches, to facilitate communications among the devices of the system 100.

Figure 2:
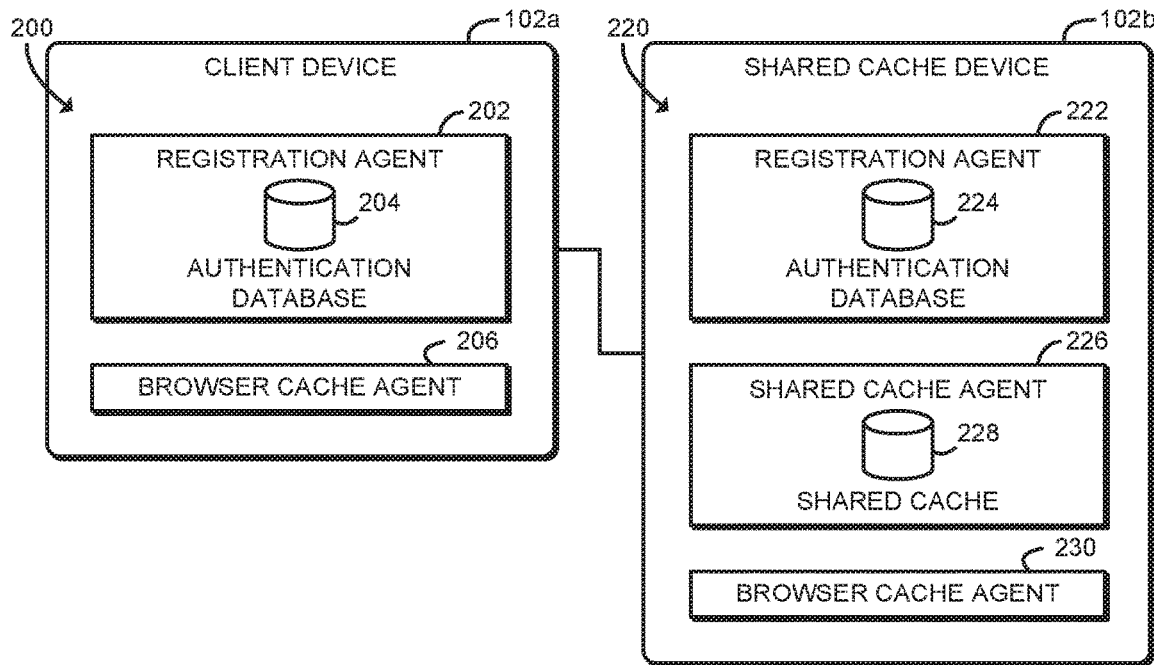
FIG. 2 is a simplified block diagram of at least one embodiment of various environments that may be established by the system of FIG. 1.

Referring now to FIG. 2, in an illustrative embodiment, a client device 102a establishes an environment 200 during operation. The illustrative environment 200 includes a registration agent 202 and a browser cache agent 206. The various components of the environment 200 may be embodied as hardware, firmware, software, or a combination thereof. As such, in some embodiments, one or more of the components of the environment 200 may be embodied as circuitry or collection of electrical devices (e.g., registration agent circuitry 202 and/or browser cache agent circuitry 206). It should be appreciated that, in such embodiments, one or more of the registration agent circuitry 202 and/or the browser cache agent circuitry 206 may form a portion of one or more of the processor 120, the I/O subsystem 122, and/or other components of the computing device 102. Additionally, in some embodiments, one or more of the illustrative components may form a portion of another component and/or one or more of the illustrative components may be independent of one another.

The registration agent 202 is configured to scan for a shared cache device 102b in local proximity to the client computing device 102a. The client device 102a may, for example, scan a local network for the shared cache device 102b or scan for the shared cache device 102b via a short-range communication protocol. The registration agent 202 is further configured to register with the shared cache device 102b in response to the scan and store authentication credentials associated with the shared cache device 102b in response to registering with the shared cache device 102b. The authentication credentials may be stored, for example, in an authentication database 204.

The browser cache agent 206 is configured to request a cached web resource from the shared cache device 102b in response to storing the authentication credentials associated with the shared cache device 102b. In some embodiments, the browser cache agent 206 may be configured to determine whether a web resource is designated as cacheable and, if cacheable, request the cached web resource that corresponds to the web resource. The browser cache agent 206 is further configured to receive, from the shared cache device 102b, a found response that indicates that the cached web resource was found by the shared cache device 102b and to receive the cached web resource from the shared cache device 102b in response to receiving the found response.

The browser cache agent 206 may be further configured to determine whether validation of the cached web resource is required in response receiving the cached web resource. The browser cache agent 206 is configured to send a request to a remote web server 104 to validate that the cached web resource has not been modified in response to determining that validation of the cached web resource is required and to receive a response from the remote web server 104. The browser cache agent 206 is further configured to determine whether the cached web resource has been modified based on the response from the remote web server 104 and to send a message to the shared cache device 102b indicating that the cached web resource has been modified in response to determining that the cached web resource has been modified.

The browser cache agent 206 may be further configured to receive, from the shared cache device 102b, a no-permission response that indicates that the client device 102a was not validated, and to raise a web browser event in response to receiving the no-permission response. The browser cache agent 206 may be further configured to receive, from the shared cache device 102b, a not-found response that indicates that the cached web resource was not found by the shared cache device 102b or an expired response that indicates that the cached web resource is expired. The browser cache agent 206 may be further configured to request a web resource 106 that corresponds to the cached web resource from a remote web server 104 in response to receiving the not-found response or the expired response.

Still referring now to FIG. 2, in the illustrative embodiment, a shared cache device 102b establishes an environment 220 during operation. The illustrative environment 220 includes a registration agent 222, a shared cache agent 226, and a browser cache agent 230. The various components of the environment 220 may be embodied as hardware, firmware, software, or a combination thereof. As such, in some embodiments, one or more of the components of the environment 220 may be embodied as circuitry or collection of electrical devices (e.g., registration agent circuitry 222, shared cache agent circuitry 226, and/or browser cache agent circuitry 230). It should be appreciated that, in such embodiments, one or more of the registration agent circuitry 222, the shared cache agent circuitry 226, and/or the browser cache agent circuitry 230 may form a portion of one or more of the processor 120, the I/O subsystem 122, and/or other components of the shared cache device 102b. Additionally, in some embodiments, one or more of the illustrative components may form a portion of another component and/or one or more of the illustrative components may be independent of one another.

The registration agent 222 is configured to register a client device 102a with the shared cache device 102b and store authentication credentials associated with the client device 102a in response to registering the client device 102a. The authentication credentials may be stored in, for example, an authentication database 224.

The shared cache agent 226 is configured to receive a request for a cached web resource from the client device 102a in response to storing the authentication credentials. The request is associated with an origin of the cached web resource. The shared cache agent 226 is further configured to determine whether a cached web resource associated with an origin that matches the request is installed in a shared cache 228 of the shared cache device 102b in response to receiving the request. The shared cache agent 226 is further configured to send a found response to the client device 102a if a matching cached web resource is installed in the shared cache 228 and to send the cached web resource to the client device 102a in response to sending the found response.

The shared cache agent 226 may be further configured to determine whether the cached web resource is expired in response to determining that the cached web resource associated with the origin that matches the request is installed in the shared cache 228 and to send an expired response to the client device 102a in response to determining that the cached web resource is expired. The shared cache agent 226 is configured to remove the cached web resource from the shared cache 228 in response to determining that the cached web resource is expired.

The shared cache agent 226 may be further configured to send a not-found response to the client device 102a in response to determining that the cached web resource associated with the origin that matches the request is not installed in the shared cache 228. The shared cache agent 226 may be further configured to determine whether the client device 102a is validated in response receiving of the request for the cached web resource and to send a no-permission response to the client device 102a in response to determining that the client device 102a is not validated.

The browser cache agent 230 is configured to download a web resource 106 from a remote web server 104. The web resource 106 is associated with an origin. The browser cache agent 230 is configured to determine whether the web resource 106 is designated as cacheable in response to downloading the web resource 106, and to install the web resource 106 in the shared cache 228 as the cached web resource in response to determining that the web resource is designated as cacheable. The cached web resource is indicative of the origin associated with the web resource 106.

The shared cache agent 226 may be further configured to determine whether the web resource 106 is designated as requiring validation in response to downloading the web resource. Sending the cached web resource to the client device 102a may include sending metadata associated with the cached web resource that indicates that the cached web resource requires validation. The shared cache agent 226 may be further configured to receive a message from the client device 102a that indicates that the cached web resource has been modified and to remove the cached web resource from the shared cache 228 in response to receiving the message from the client device 102a.

Additionally, although illustrated as being established by two computing devices 102a, 102b, it should be understood that in some embodiments a single computing device 102 may perform the roles of both the client device 102a and the shared cache device 102b. Thus, in some embodiments, a single computing device 102 may establish part or all of both environments 200, 220.

Figure 3:
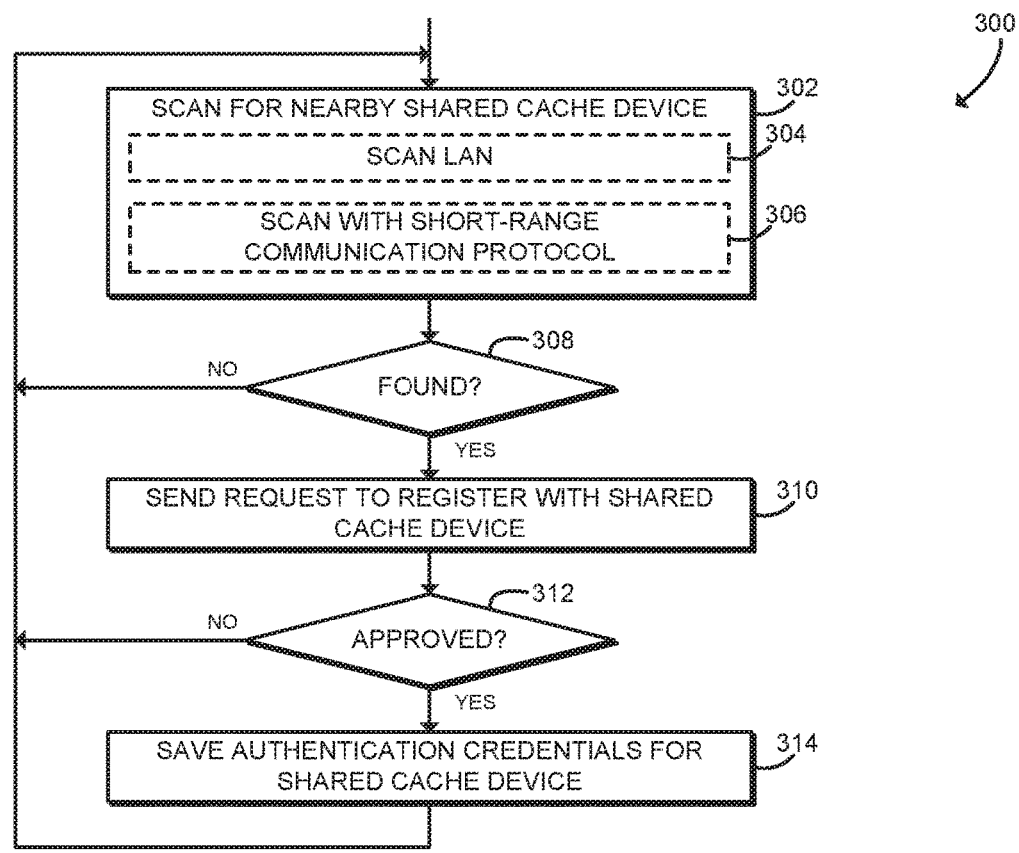
FIG. 3 is a simplified flow diagram of at least one embodiment of a method for shared cache discovery that may be executed by a client computing device of FIGS. 1-2.

Referring now to FIG. 3, in use, a client device 102a may execute a method 300 for shared cache discovery. It should be appreciated that, in some embodiments, the operations of the method 300 may be performed by one or more modules of the environment 200 of the client device 102a as shown in FIG. 2. The method 300 begins in block 302, in which the client device 102a scans for a nearby shared cache device 102b. The client device 102a may scan for the nearby shared cache device 102b using any appropriate network service discovery protocol or other discovery protocol. In some embodiments, in block 304, the client device 102a scans a local-area network for the shared cache device 102b. The client device 102a may scan, for example, a local wireless network, a local wired network, or any other local network subdivision. In some embodiments, in block 306 the client device 102a may scan for the shared cache device 102b using a short-range communication protocol. For example, the client device 102a may scan using a short-range radio communication technology such as Bluetooth, near-field communication (NFC), or other short-range protocol.

In block 308, the client device 102a determines whether a shared cache device 102b has been found. If not, the method 300 loops back to block 302 to continue scanning for a shared cache device 102b. If a shared cache device 102b has been found, the method 300 advances to block 310.

In block 310, the client device 102a sends a request to register with the shared cache device 102b. The request to register may include identification information of the client device 102a and/or a user of the client device 102a. For example, the request to register may include a device identifier and authentication credentials. In block 312, the client device 102a determines whether the request to register has been approved. For example, the shared cache device 102b may validate the authentication credentials or perform other security or policy checks before returning an approval to the client device 102a. One potential embodiment of a method for processing the request to register is described below in connection with FIG. 5. If the registration request was not approved, the method 300 loops back to block 302 to continue scanning for a nearby shared cache device 102b. If the registration request is approved, the method 300 advances to block 314.

In block 314, the client device 102a saves authentication credentials for the shared cache device 102b. The client device 102a may, for example, store a device identifier and authentication credentials associated with the shared cache device 102b into the authentication database 204. The authentication credentials may allow the client device 102a and the shared cache device 102b to establish a secure communication channel to receive cached web resources as described further below. After registering and saving the authentication credentials, the client device 102a may request cached web resources from the shared cache device 102b as described below in connection with FIG. 4. After saving the authentication credentials, the method 300 loops back to block 302, in which the client device 102a may continue scanning for nearby shared cache computing devices 102b.

Figure 4:
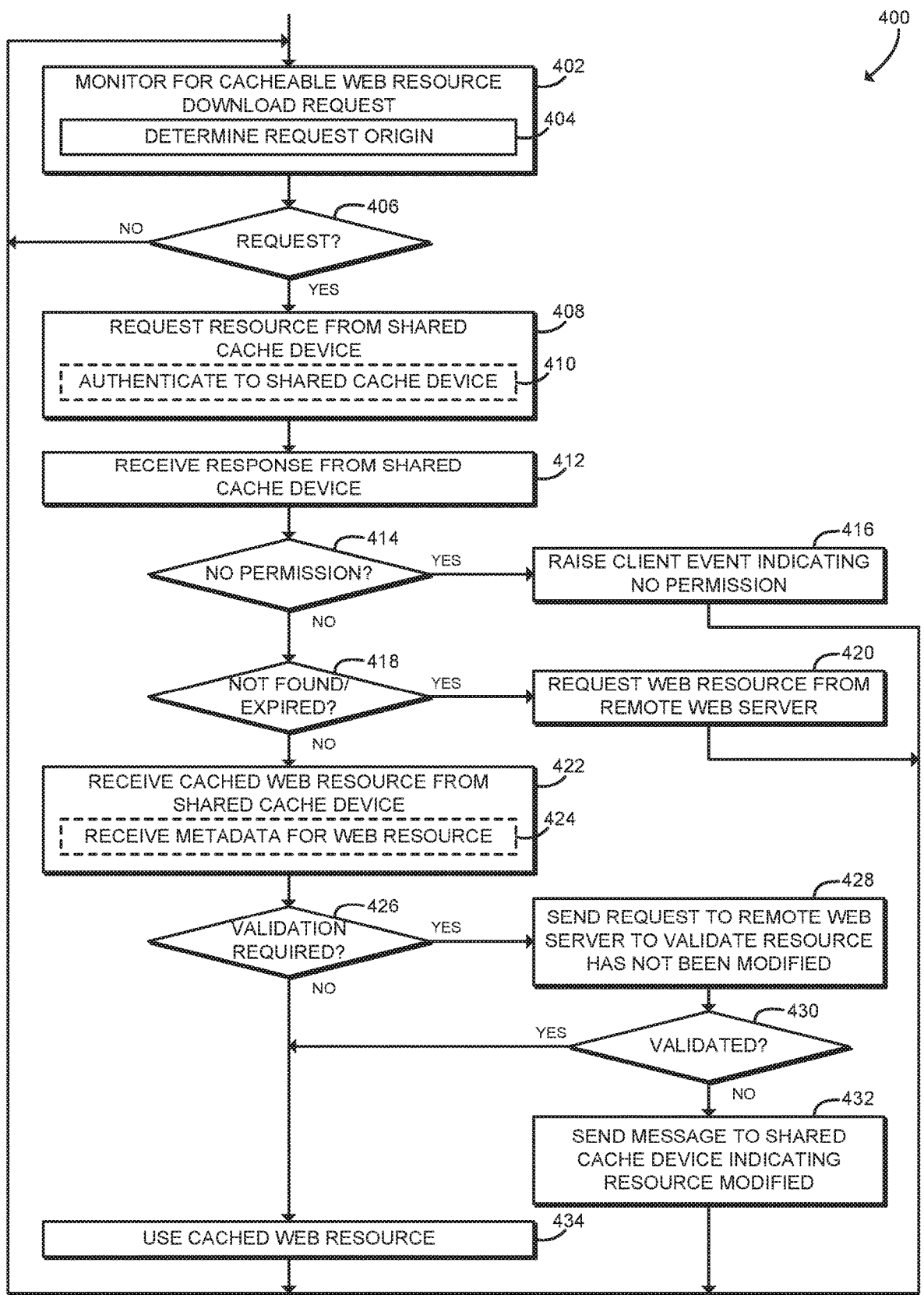
FIG. 4 is a simplified flow diagram of at least one embodiment of a method for cached resource retrieval that may be executed by the client computing device of FIGS. 1-2.

Referring now to FIG. 4, in use, a client device 102a may execute a method 400 for cached resource retrieval. It should be appreciated that, in some embodiments, the operations of the method 400 may be performed by one or more modules of the environment 200 of the client device 102a as shown in FIG. 2. The method 400 begins in block 402, in which the client device 102a monitors for a cacheable web resource download request. The download request may be generated by a web browser or a web application during a web browsing session, for example in response to a user clicking a link, entering a URI, or otherwise loading a web page. The web resource may be embodied as any downloadable web resource including a textual markup document (e.g., HTML, XML, or other textual markup file), a linked image, a script file, a stylesheet, or other resource. The web resource may be designated as cacheable in a shared cache 228 by the web developer. In some embodiments, the web page markup may designate a particular resource as cacheable, for example by including a predefined HTML attribute such as "x-devices" on the appropriate HTML element (e.g., on an image tag). In some embodiments, a web page or web application may expressly invoke an API function to designate a resource as cacheable.

In block 404, the client device 102a determines an origin for the request for the cached web resource. The origin may be embodied as, for example, a tuple identifying a URI scheme, host, and port number associated with the cached web resource. As described further below, the origin may be used by the shared cache device 102b to enforce security boundaries for cached web resources.

In block 406, the client device 102a determines whether a request to download a cacheable web resource has been detected. If not, the method 400 loops back to block 402 to continue monitoring for requests to download web resources. If a request to download a cacheable web resource has been detected, the method 400 advances to block 408.

In block 408, the client device 102a requests the web resource from the shared cache device 102b. The request identifies the requested web resource and the associated origin, for example by forwarding the URI of the requested web resource. The client device 102a may send the request to a nearby shared cache device 102b that was discovered using the method 300 described above in connection with FIG. 3. In some embodiments, in block 410 the client device 102a may authenticate to the shared cache device 102b. For example, the client device 102a may submit a device identifier and credentials generated during authentication as described above in connection with FIG. 3. After authenticating, communications between the client device 102a and the shared cache device 102b may be encrypted or otherwise communicated over a secure channel.

In block 412, the client device 102a receives a response from the shared cache device 102b. The shared cache device 102b sends the response after processing the request for the cached web resource and may send one of several types of responses based on the results of processing the request for the cached web resource. One potential embodiment of a method for processing the request for the cached web resource is described below in connection with FIG. 7.

In block 414, the client device 102a determines whether a no-permission response was received from the shared cache device 102b. A no-permission response indicates that the client device 102a was not successfully validated by the shared cache device 102b. If a no-permission response was not received, the method 400 advances to block 418, described below. If a no-permission response was received, the method 400 branches to block 416, in which the client device 102a raises a web browser event indicating no permission. The event may be handled by client code such as, for example, a web page script or web application code. For example, the client device 102a may dispatch a DOM event, call a JavaScript event handler, or otherwise raise a browser event. After raising the event, the method 400 loops back to block 402 to monitor for additional requests for cacheable web resources.

Referring back to block 414, if a no-permission response was not received, the method 400 advances to block 418, in which the client device 102a determines whether a not-found response or an expired response was received. A not-found response indicates that a cached web resource matching the requested web resource, including the origin of the request, was not found in the shared cache 228. An expired response indicates that a matching cached web resource was found in the shared cache 228, but has expired. If a not-found response or an expired response was not received (e.g., if a found response was received), the method 400 advances to block 422, described below. If a not-found response or an expired response was received, the method 400 branches to block 420, in which the client device 102a requests the web resource from a remote web server 104. The remote web server 104 may respond with the requested web resource from the associated web resources 106. After requested the web resource from the remote web server 104, the method 400 loops back to block 402 to monitor for additional requests for cacheable web resources.

Referring back to block 418, if a not-found response or an expired response was not received (e.g., if a found response was received), the method 400 advances to block 422, in which the client device 102a receives the requested cached web resource from the shared cache device 102b. In some embodiments, in block 424 the client device 102a may also receive metadata associated with the requested cached web resource. For example, the client device 102a may receive one or more HTTP headers associated with the cached web resource.

In block 426, the client device 102a determines whether validation is required for the cached web resource. The client device 102a may, for example, examine metadata such as one or more HTTP headers associated with the cached web resource to determine whether validation is required. If validation is not required, then the method 400 advances to block 434, described below. If validation is required, then the method 400 branches to block 428.

In block 428, the client device 102a sends a request to a remote web server 104 associated with the cached web resource to validate that the web resource 106 corresponding to the cached web resource has not been modified. The client device 102a may receive a response (e.g., an HTTP response) indicating whether the web resource has been modified since being installed in the shared cache 228. In block 430, the client device 102a determines whether the cached web resource was successfully validated. If so, the method 400 branches to block 434, described below. If not validated, the method 400 advances to block 432, in which the client device 102a sends a message to the shared cache device 102b indicating that the web resource 106 corresponding to the cached web resource has been modified. In response, the shared cache device 102b may remove the cached web resource from the shared cache 228. After sending the message to the shared cache device 102b, the method 400 loops back to block 402 to monitor for additional requests for cacheable web resources. In some embodiments, the client device 102a may re-attempt the request for the cached web resource, which may result in the client device 102a downloading the web resource 106 from the remote web server 104.

Referring back to blocks 426, 430, if validation was not required or if the cached web resource was successfully validated, the method 400 advances to block 434, in which the client device 102a uses the cached web resource. The client device 102a may render, parse, or otherwise use the cached web resource to display a web page, execute a web application, or otherwise perform browser tasks with the cached web resource. After using the cached web resource, the method 400 loops back to block 402 to monitor for additional requests for cacheable web resources.

Figure 5:
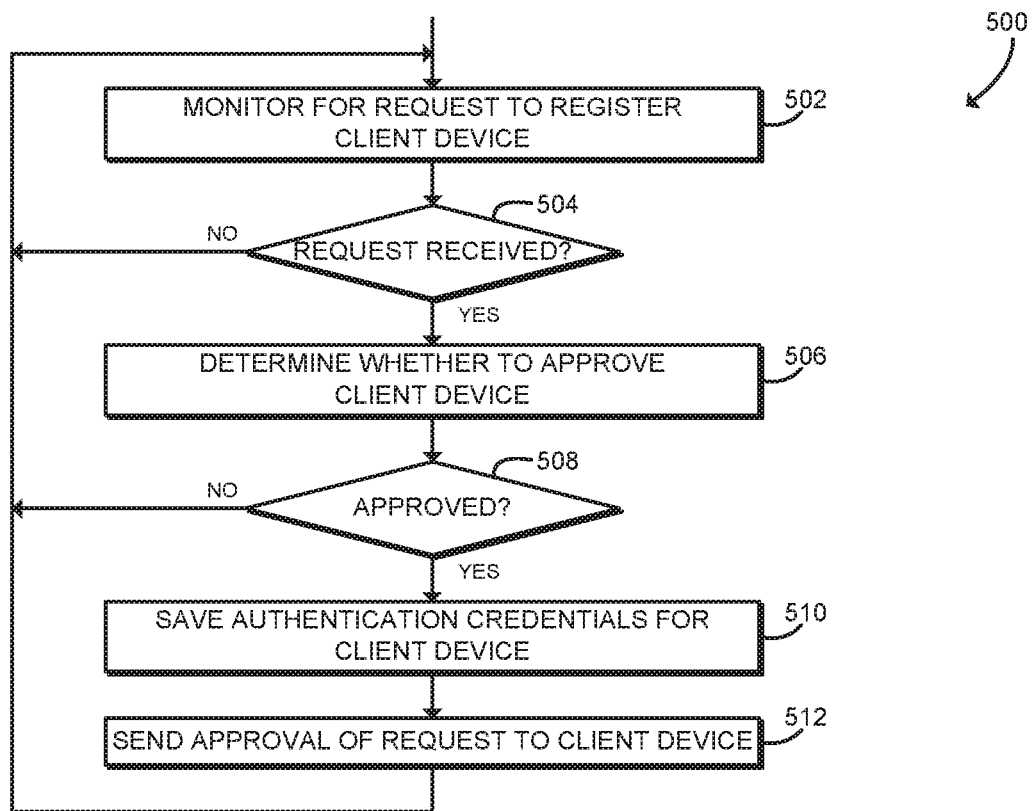
FIG. 5 is a simplified flow diagram of at least one embodiment of a method for device registration that may be executed by a shared cache computing device of FIGS. 1-2.

Referring now to FIG. 5, in use, a shared cache device 102b may execute a method 500 for client device registration. It should be appreciated that, in some embodiments, the operations of the method 500 may be performed by one or more modules of the environment 220 of the shared cache device 102b as shown in FIG. 2. The method 500 begins in block 502, in which the shared cache device 102b monitors for a request to register a client device 102a. The request may be sent by the client device 102a in response to scanning for a nearby shared cache device 102b, as described above in connection with FIG. 3. In block 504, the shared cache device 102b determines whether a request for registration has been received. If not, the method 500 loops back to block 502 to continue monitoring for requests to register a client device 102a. If a request is received, the method 500 advances to block 506.

In block 506, the shared cache device 102b determines whether to approve the request to register the client device 102a. The shared cache device 102b may, for example, verify authentication credentials provided by the client device 102a, perform one or more security or policy checks, or otherwise verify the client device 102a. In block 508, the shared cache device 102b checks whether the client device 102a was approved. If not, the method 500 loops back to block 502 to continue monitoring for requests to register a client device 102a. If the client device 102a was approved, the method 500 advances to block 510.

In block 510, the shared cache device 102b saves authentication credentials for the client device 102a. The shared cache device 102b may, for example, store a device identifier and authentication credentials associated with the client device 102a into the authentication database 224. As described above, the authentication credentials may allow the client device 102a and the shared cache device 102b to establish a secure communication channel to transmit cached web resources as described further below. In block 512, the shared cache device 102b sends an approval of the request to the client device 102a. After sending the approval, the shared cache device 102b may process requests for cached web resources from the client device 102a. One potential embodiment of a method for processing requests for cached web resources is described further below in connection with FIG. 7. After sending the approval, the method 500 loops back to block 502 to continue monitoring for requests to register a client device 102a.

Figure 6:
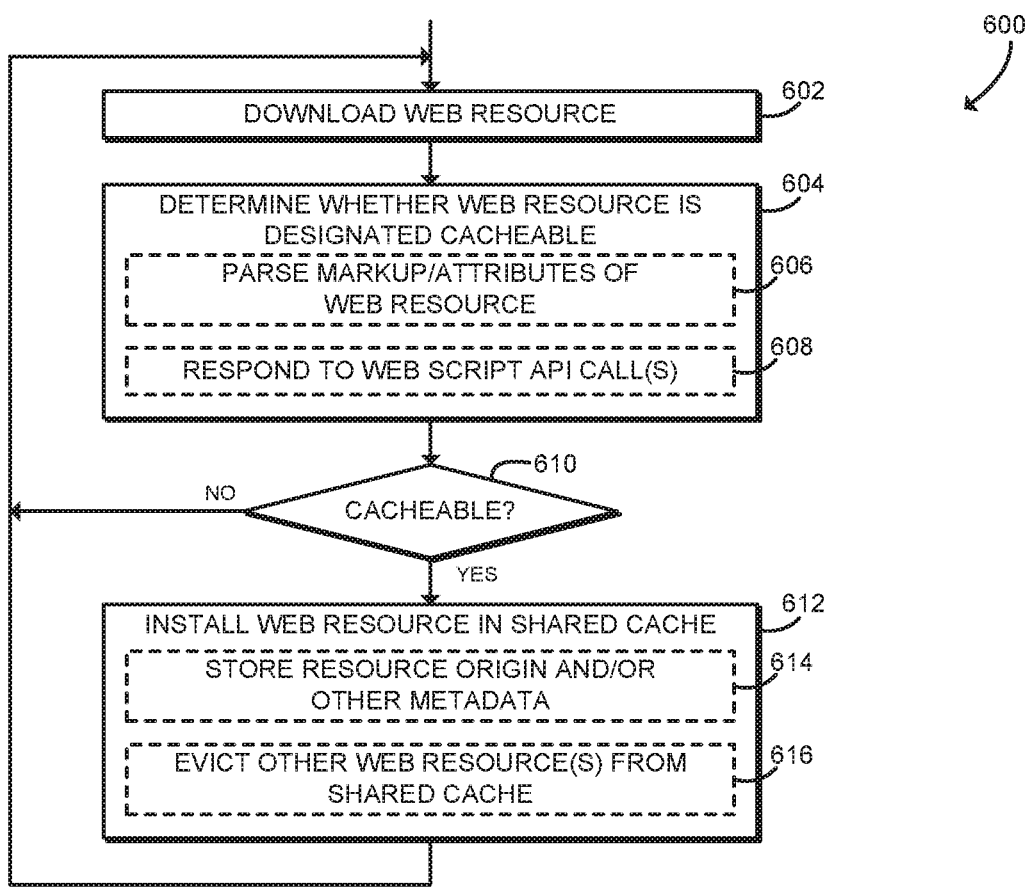
FIG. 6 is a simplified flow diagram of at least one embodiment of a method for cached resource installation that may be executed by the shared cache computing device of FIGS. 1-2.

Referring now to FIG. 6, in use, a shared cache device 102b may execute a method 600 for cached web resource installation. It should be appreciated that, in some embodiments, the operations of the method 600 may be performed by one or more modules of the environment 220 of the shared cache device 102b as shown in FIG. 2. The method 600 begins in block 602, in which the shared cache device 102b downloads a web resource 106 from a remote web server 104. The download may be performed by a web browser or a web application during a web browsing session, for example in response to a user clicking a link, entering a URI, or otherwise loading a web page. The web resource may be embodied as any downloadable web resource such as a textual markup document (e.g., HTML, XML, or other textual markup file), a linked image, a script file, a stylesheet, or other resource.

In block 604, the shared cache device 102b determines whether the web resource 106 is designated as cacheable. The web resource 106 may be designated as cacheable in the shared cache 228 by the web developer or other source of the web resource 106. In some embodiments, in block 606 the shared cache device 102b may parse markup (including attributes) of the web resource to determine whether the resource is cacheable. For example, one or more HTML entities or attributes may designate a particular resource as cacheable. In an illustrative embodiment, an HTML element (such as an image tag, a script tag, a link tag, or other element that identifies an external resource) may include one or more particular predefined HTML attributes (e.g., an "x-devices" attribute) indicating that the associated web resource 106 is cacheable. In some embodiments, in block 608 the shared cache device 102b may respond to one or more calls from a web script to a web application programming interface (API). For example, the web page or web application may expressly invoke an API function (e.g., a DOM function, a JavaScript function, or other API function) to designate a resource as cacheable. Continuing that example, a web application may invoke a function such as register( ) with the URI of the web resource 106 that is designated as cacheable.

In block 610, the shared cache device 102b checks whether the web resource 106 is cacheable. If not, the method 600 loops back to block 602 to continue downloading web resources 106. If the web resource 106 is cacheable, the method 600 advances to block 612.

In block 612, the shared cache device 102b installs the downloaded web resource 106 into the shared cache 228. As described further below in connection with FIG. 7, after being installed in the shared cache 228, the cached web resource may be available to be transmitted to one or more client devices 102a. In some embodiments, in block 614, the shared cache device 102b also stores the origin of the web resource and/or other related metadata in the shared cache 228. The origin may be embodied as, for example, a tuple identifying a URI scheme, host, and port number associated with the cached web resource. As described further below in connection with FIG. 7, the origin may be used to enforce security boundaries for cached web resources. The shared cache device 102b may store additional metadata such as HTTP headers associated with the web resource. In particular, the shared cache device 102b may store metadata relating to cache freshness including expiration data and/or whether validation with the remote web server 104 is required. In some embodiments, in block 616 the shared cache device 102b may evict one or more other cached web resources from the shared cache 228 before installing the cached web resource. For example, the shared cache device 102b may evict cached web resources to free up space in the shared cache 228. The shared cache device 102b may use any appropriate cache eviction policy, such as a least recently used policy. Additionally or alternatively, in some embodiments the shared cache device 102b may remove cached web resources from the shared cache 228 in other circumstances, including in response to an express command to clear a resource the shared cache from a web application (e.g., calling a DOM function, a JavaScript function, or other API function), and/or in response to a user command to clear the shared cache 228. After installing the cached web resource, the method 600 loops back to block 602 to continue downloading web resources 106.

Figure 7:
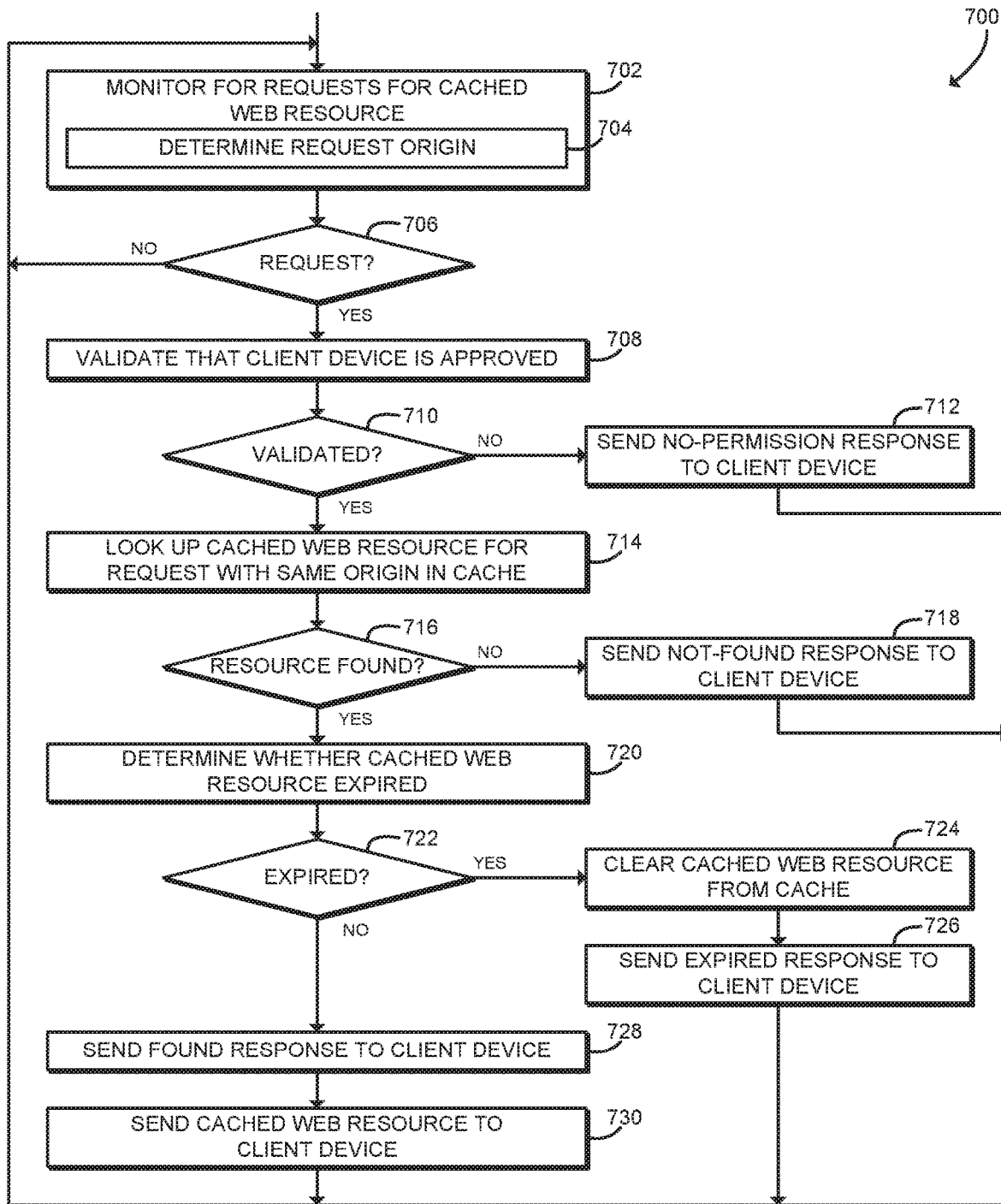
FIG. 7 is a simplified flow diagram of at least one embodiment of a method for cached resource retrieval that may be executed by the shared cache computing device of FIGS. 1-2.

Referring now to FIG. 7, in use, a shared cache device 102b may execute a method 700 for cached web resource retrieval. It should be appreciated that, in some embodiments, the operations of the method 700 may be performed by one or more modules of the environment 220 of the shared cache device 102b as shown in FIG. 2. The method 700 begins in block 702, in which the shared cache device 102b monitors for requests for a cached web resource from a client device 102a. The request for the cached web resource may, for example, identify a URI of a web resource 106 available on a remote web server 104. In block 704, the shared cache device 102b determines the origin of the request. As described above, the origin may be embodied as, for example, a tuple identifying a URI scheme, host, and port number associated with the cached web resource. The origin may represent, for example, the URI scheme, host, and port number associated with an HTML document that references the requested cached web resource (e.g., an image, script file, stylesheet, or other resource linked from the HTML document). In block 706, the shared cache device 102b determines whether a request has been received. If not, the method 700 loops back to block 702 to continue monitoring for requests. If a request has been received, the method 700 advances to block 708.

In block 708, the shared cache device 102b validates that the client device 102a is approved to access the shared cache 228. The shared cache device 102b may verify that the client device 102a was successfully registered with the shared cache device 102b as described above in connection with FIG. 4. The shared cache device 102b may, for example, verify a device identifier and authentication credentials submitted by the client device 102a against the authentication database 224. After authenticating, communications between the client device 102a and the shared cache device 102b may be encrypted or otherwise communicated over a secure channel. Note that although illustrated as occurring after receiving the request, it should be understood that in some embodiments authentication may occur before receiving the request and that the request may be received over the secure channel.

In block 710, the shared cache device 102b checks whether the client device 102a was validated. If so, the method 700 advances to block 714, described below. If the client device 102a was not validated, the method 700 branches to block 712, in which the shared cache device 102b sends a no-permission response to the client device 102a. After sending the response, the method 700 loops back to block 702 to continue monitoring for requests for cached web resources.

Referring back to block 710, if the client device 102a is validated, the method 700 advances to block 714, in which the shared cache device 102b looks up a cached web resource matching the request and having the same origin in the shared cache 228. Thus, by restricting the lookup to cached web resources having the same origin, the shared cache device 102b may enforce a same-origin security policy. In block 716, the shared cache device 102b determines whether a matching cached web resource was found. If so, the method 700 advances to block 720, described below. If a matching cached web resource was not found, the method 700 branches to block 718, in which the shared cache device 102b sends a not-found response to the client device 102a. After sending the response, the method 700 loops back to block 702 to continue monitoring for requests for cached web resources.

Referring back to block 716, if a cached web resource was found, the method 700 advances to block 720, in which the shared cache device 102b determines whether the cached web resource has expired. The shared cache device 102b may, for example, examine metadata associated with the cached web resource included in the shared cache 228, such as an expiration date. In block 722, the shared cache device 102b checks whether the cached web resource has expired. If not, the method 700 advances to block 728, described below. If the cached web resource has expired, the method 700 branches to block 724, in which the shared cache device 102b clears the cached web resource from the shared cache 228. In block 726, the shared cache device 102b sends an expired response to the client device 102a. After sending the response, the method 700 loops back to block 702 to continue monitoring for requests for cached web resources.

Referring back to block 722, if the cached web resource is not expired, the method 700 advances to block 728, in which the shared cache device 102b sends a found response to the client device 102a. In block 730, the shared cache device 102b sends the cached web resource to the client device 102a. The shared cache device 102b may also send metadata associated with the requested cached web resource. For example, the shared cache device 102b may send one or more HTTP headers associated with the cached web resource. In particular, the metadata may indicate whether the client device 102a is required to validate the cached web resource with the remote web server 104 prior to using the cached web resource. As described above in connection with FIG. 4, if the cached web resource is not successfully validated, the client device 102a may send the shared cache device 102b a message indicating that the resource was not successfully validated. The shared cache device 102b may remove the cached web resource from the shared cache 228 in response to a message indicating that the resource was not successfully validated. After sending the cached web resource to the client device 102a, the method 700 loops back to block 702 to continue monitoring for requests for cached web resources.

It should be appreciated that, in some embodiments, the methods 300, 400, 500, 600, and/or 700 may be embodied as various instructions stored on a computer-readable media, which may be executed by the processor 120, the I/O subsystem 122, and/or other components of a computing device 102 to cause the computing device 102 to perform the respective method 300, 400, 500, 600, and/or 700. The computer-readable media may be embodied as any type of media capable of being read by a computing device 102 including, but not limited to, the memory 124, the data storage device 126, firmware devices, and/or other media.

EXAMPLES

Illustrative examples of the technologies disclosed herein are provided below. An embodiment of the technologies may include any one or more, and any combination of, the examples described below.

Example 1 includes a computing device for shared cache access, the computing device comprising: a registration agent to (i) scan for a shared cache device in local proximity to the computing device, (ii) register with the shared cache device in response to a scan for the shared cache device, and (iii) store authentication credentials associated with the shared cache device in response to registration with the shared cache device; and a browser cache agent to (i) request a cached web resource from the shared cache device in response to storage of the authentication credentials associated with the shared cache device, (ii) receive a found response from the shared cache device in response to a request of the cached web resource, wherein the found response indicates that the cached web resource was found by the shared cache device, and (iii) receive the cached web resource from the shared cache device in response to receipt of the found response.

Example 2 includes the subject matter of Example 1, and wherein to register with the shared cache device comprises to: send a registration request to the shared cache device in response to the scan for the shared cache device; and receive an approval from the shared cache device in response to sending of the registration request.

Example 3 includes the subject matter of any of Examples 1 and 2, and wherein to request the cached web resource from the shared cache device comprises to send a request indicative of the cached web resource and an origin of the cached web resource.

Example 4 includes the subject matter of any of Examples 1-3, and wherein the browser cache agent is further to: receive a no-permission response from the shared cache device in response to the request of the cached web resource, wherein the no-permission response indicates that the client device was not validated; and raise a web browser event in response to receipt of the no-permission response.

Example 5 includes the subject matter of any of Examples 1-4, and wherein the browser cache agent is further to: receive a not-found response or an expired response from the shared cache device in response to the request of the cached web resource, wherein the not-found response indicates that the cached web resource was not found by the shared cache device and wherein the expired response indicates that the cached web resource is expired; and request a web resource that corresponds to the cached web resource from a remote web server in response to receipt of the not-found response or the expired response.

Example 6 includes the subject matter of any of Examples 1-5, and wherein the browser cache agent is further to: determine whether validation of the cached web resource is required in response receipt of the cached web resource; send a request to a remote web server to validate that the cached web resource has not been modified in response to a determination that validation of the cached web resource is required; receive a response from the remote web server; determine whether the cached web resource has been modified based on the response from the remote web server; and send a message to the shared cache device indicating that the cached web resource has been modified in response to a determination that the cached web resource has been modified.

Example 7 includes the subject matter of any of Examples 1-6, and wherein to receive the cached web resource comprises to receive metadata associated with the cached web resource, wherein the metadata is indicative of whether validation of the cached web resource is required.

Example 8 includes the subject matter of any of Examples 1-7, and wherein: the browser cache agent is further to determine whether a web resource is designated as cacheable; and to request the cached web resource from the shared cache device comprises to request a cached web resource that corresponds to the web resource from the shared cache device in response to a determination that the web resource is designated as cacheable.

Example 9 includes the subject matter of any of Examples 1-8, and wherein to determine whether the web resource is designated as cacheable comprises to determine whether an element of a hypertext document designates the web resource as cacheable.

Example 10 includes the subject matter of any of Examples 1-9, and wherein to determine whether the web resource is designated as cacheable comprises to receive a web application programming interface command that designates the web resource as cacheable.

Example 11 includes the subject matter of any of Examples 1-10, and wherein the web application programming interface command comprises a web scripting environment command.

Example 12 includes the subject matter of any of Examples 1-11, and wherein to scan for the shared cache device in local proximity to the computing device comprises to scan a local network for the shared cache device.

Example 13 includes the subject matter of any of Examples 1-12, and wherein to scan for the shared cache device in local proximity to the computing device comprises to scan via a short-range communication protocol.

Example 14 includes a computing device for shared cache access, the computing device comprising: a registration agent to (i) register a client device with the computing device and (ii) store authentication credentials associated with the client device in response to registration of the client device; and a shared cache agent to (i) receive a request for a cached web resource from the client device in response to storage of the authentication credentials, wherein the request is associated with an origin of the cached web resource, (ii) determine whether a cached web resource associated with an origin that matches the request is installed in a shared cache of the computing device in response to receipt of the request for the cached web resource, (iii) send a found response to the client device in response to a determination that the cached web resource associated with the origin that matches the request is installed in the shared cache, and (iv) send the cached web resource to the client device in response to a send of the found response.

Example 15 includes the subject matter of Example 14, and wherein to register the client device with the computing device comprises to: receive a request to register a client device; verify the client device in response to receipt of the request to register the client device; and send an approval to the client device in response to verification of the client device.

Example 16 includes the subject matter of any of Examples 14 and 15, and wherein the shared cache agent is further to send a not-found response to the client device in response to a determination that the cached web resource associated with the origin that matches the request is not installed in the shared cache.

Example 17 includes the subject matter of any of Examples 14-16, and wherein the shared cache agent is further to: determine whether the client device is validated in response to receipt of the request for the cached web resource; and send a no-permission response to the client device in response to a determination that the client device is not validated.

Example 18 includes the subject matter of any of Examples 14-17, and wherein the shared cache agent is further to: determine whether the cached web resource is expired in response to the determination that the cached web resource associated with the origin that matches the request is installed in the shared cache; send an expired response to the client device in response to a determination that the cached web resource is expired; and remove the cached web resource from the shared cache in response to the determination that the cached web resource is expired; wherein to send the found response further comprises to send the found response to the client device in response to a determination that the shared web resource is not expired.

Example 19 includes the subject matter of any of Examples 14-18, and further comprising a browser cache agent to: download a web resource from a remote web server, wherein the web resource is associated with an origin; determine whether the web resource is designated as cacheable in response to a download of the web resource; and install the web resource in the shared cache as the cached web resource in response to a determination that the web resource is designated as cacheable, wherein the cached web resource is indicative of the origin associated with the web resource.

Example 20 includes the subject matter of any of Examples 14-19, and wherein to determine whether the web resource is designated as cacheable comprises to determine whether an element of a hypertext document designates the web resource as cacheable.

Example 21 includes the subject matter of any of Examples 14-20, and wherein to determine whether the web resource is designated as cacheable comprises to receive a web application programming interface command that designates the web resource as cacheable.

Example 22 includes the subject matter of any of Examples 14-21, and wherein: the shared cache agent is further to determine whether the web resource is designated as requiring validation in response to the download of the web resource; and to send the cached web resource comprises to send metadata associated with the cached web resource, wherein the metadata indicates that the cached web resource requires validation in response to a determination that the web resource is designated as requiring validation.

Example 23 includes the subject matter of any of Examples 14-22, and wherein the shared cache agent is further to: receive a message from the client device that indicates that the cached web resource has been modified in response to the send of the found response; and remove the cached web resource from the shared cache in response to receipt of the message from the client device.

Example 24 includes the subject matter of any of Examples 14-23, and wherein to install the web resource in the shared cache comprises to evict an older cached web resource from the shared cache.

Example 25 includes a method for shared cache access, the method comprising: scanning, by a computing device, for a shared cache device in local proximity to the computing device; registering, by the computing device, with the shared cache device in response to scanning for the shared cache device; storing, by the computing device, authentication credentials associated with the shared cache device in response to registering with the shared cache device; requesting, by the computing device, a cached web resource from the shared cache device in response to storing the authentication credentials associated with the shared cache device; receiving, by the computing device, a found response from the shared cache device in response to requesting the cached web resource, wherein the found response indicates that the cached web resource was found by the shared cache device; and receiving, by the computing device, the cached web resource from the shared cache device in response to receiving the found response.

Example 26 includes the subject matter of Example 25, and wherein registering with the shared cache device comprises: sending, by the computing device, a registration request to the shared cache device in response to scanning for the shared cache device; and receiving, by the computing device, an approval from the shared cache device in response to sending the registration request.

Example 27 includes the subject matter of any of Examples 25 and 26, and wherein requesting the cached web resource from the shared cache device comprises sending a request indicative of the cached web resource and an origin of the cached web resource.

Example 28 includes the subject matter of any of Examples 25-27, and further comprising: receiving, by the computing device, a no-permission response from the shared cache device in response to requesting the cached web resource, wherein the no-permission response indicates that the client device was not validated; and raising, by the computing device, a web browser event in response to receiving the no-permission response.

Example 29 includes the subject matter of any of Examples 25-28, and further comprising: receiving, by the computing device, a not-found response or an expired response from the shared cache device in response to requesting the cached web resource, wherein the not-found response indicates that the cached web resource was not found by the shared cache device and wherein the expired response indicates that the cached web resource is expired; and requesting, by the computing device, a web resource corresponding to the cached web resource from a remote web server in response to receiving the not-found response or the expired response.

Example 30 includes the subject matter of any of Examples 25-29, and further comprising: determining, by the computing device, whether validation of the cached web resource is required in response to receiving the cached web resource; sending, by the computing device, a request to a remote web server to validate that the cached web resource has not been modified in response to determining that validation of the cached web resource is required; receiving, by the computing device, a response from the remote web server; determining, by the computing device, whether the cached web resource has been modified based on the response from the remote web server; and sending, by the computing device, a message to the shared cache device indicating that the cached web resource has been modified in response to determining that the cached web resource has been modified.

Example 31 includes the subject matter of any of Examples 25-30, and wherein receiving the cached web resource comprises receiving metadata associated with the cached web resource, wherein the metadata is indicative of whether validation of the cached web resource is required.

Example 32 includes the subject matter of any of Examples 25-31, and further comprising: determining, by the computing device, whether a web resource is designated as cacheable; wherein requesting the cached web resource from the shared cache device comprises requesting a cached web resource corresponding to the web resource from the shared cache device in response to determining that the web resource is designated as cacheable.

Example 33 includes the subject matter of any of Examples 25-32, and wherein determining whether the web resource is designated as cacheable comprises determining whether an element of a hypertext document designates the web resource as cacheable.

Example 34 includes the subject matter of any of Examples 25-33, and wherein determining whether the web resource is designated as cacheable comprises receiving a web application programming interface command that designates the web resource as cacheable.

Example 35 includes the subject matter of any of Examples 25-34, and wherein the web application programming interface command comprises a web scripting environment command.

Example 36 includes the subject matter of any of Examples 25-35, and wherein scanning for the shared cache device in local proximity to the computing device comprises scanning a local network for the shared cache device.

Example 37 includes the subject matter of any of Examples 25-36, and wherein scanning for the shared cache device in local proximity to the computing device comprises scanning via a short-range communication protocol.

Example 38 includes a method for shared cache access, the method comprising: registering, by a computing device, a client device with the computing device; storing, by the computing device, authentication credentials associated with the client device in response to registering the client device; receiving, by the computing device, a request for a cached web resource from the client device in response to storing the authentication credentials, wherein the request is associated with an origin of the cached web resource; determining, by the computing device, whether a cached web resource associated with an origin that matches the request is installed in a shared cache of the computing device in response to receiving the request for the cached web resource; sending, by the computing device, a found response to the client device in response to determining that the cached web resource associated with the origin that matches the request is installed in the shared cache; and sending, by the computing device, the cached web resource to the client device in response to sending the found response.

Example 39 includes the subject matter of Example 38, and wherein registering the client device with the computing device comprises: receiving, by the computing device, a request to register a client device; verifying the client device in response to receiving the request to register the client device; and sending an approval to the client device in response to verifying the client device.

Example 40 includes the subject matter of any of Examples 38 and 39, and further comprising sending, by the computing device, a not-found response to the client device in response to determining that the cached web resource associated with the origin that matches the request is not installed in the shared cache.

Example 41 includes the subject matter of any of Examples 38-40, and further comprising: determining, by the computing device, whether the client device is validated in response to receiving the request for the cached web resource; and sending, by the computing device, a no-permission response to the client device in response to determining that the client device is not validated.

Example 42 includes the subject matter of any of Examples 38-41, and further comprising: determining, by the computing device, whether the cached web resource is expired in response to determining that the cached web resource associated with the origin that matches the request is installed in the shared cache; sending, by the computing device, an expired response to the client device in response to determining that the cached web resource is expired; and removing, by the computing device, the cached web resource from the shared cache in response to determining that the cached web resource is expired; wherein sending the found response further comprises sending the found response to the client device in response to determining that the shared web resource is not expired.

Example 43 includes the subject matter of any of Examples 38-42, and further comprising: downloading, by the computing device, a web resource from a remote web server, wherein the web resource is associated with an origin; determining, by the computing device, whether the web resource is designated as cacheable in response to downloading the web resource; and installing, by the computing device, the web resource in the shared cache as the cached web resource in response to determining that the web resource is designated as cacheable, wherein the cached web resource is indicative of the origin associated with the web resource.

Example 44 includes the subject matter of any of Examples 38-43, and wherein determining whether the web resource is designated as cacheable comprises determining whether an element of a hypertext document designates the web resource as cacheable.

Example 45 includes the subject matter of any of Examples 38-44, and wherein determining whether the web resource is designated as cacheable comprises receiving a web application programming interface command that designates the web resource as cacheable.

Example 46 includes the subject matter of any of Examples 38-45, and further comprising: determining, by the computing device, whether the web resource is designated as requiring validation in response to downloading the web resource; wherein sending the cached web resource comprises sending metadata associated with the cached web resource, wherein the metadata indicates that the cached web resource requires validation in response to determining that the web resource is designated as requiring validation.

Example 47 includes the subject matter of any of Examples 38-46, and further comprising: receiving, by the computing device, a message from the client device indicating that the cached web resource has been modified in response to sending the found response; and removing, by the computing device, the cached web resource from the shared cache in response to receiving the message from the client device.

Example 48 includes the subject matter of any of Examples 38-47, and wherein installing the web resource in the shared cache comprises evicting an older cached web resource from the shared cache.

Example 49 includes a computing device comprising: a processor; and a memory having stored therein a plurality of instructions that when executed by the processor cause the computing device to perform the method of any of Examples 25-48.

Example 50 includes one or more machine readable storage media comprising a plurality of instructions stored thereon that in response to being executed result in a computing device performing the method of any of Examples 25-48.

Example 51 includes a computing device comprising means for performing the method of any of Examples 25-48.

Example 52 includes a computing device for shared cache access, the computing device comprising: means for scanning for a shared cache device in local proximity to the computing device; means for registering with the shared cache device in response to scanning for the shared cache device; means for storing authentication credentials associated with the shared cache device in response to registering with the shared cache device; means for requesting a cached web resource from the shared cache device in response to storing the authentication credentials associated with the shared cache device; means for receiving a found response from the shared cache device in response to requesting the cached web resource, wherein the found response indicates that the cached web resource was found by the shared cache device; and means for receiving the cached web resource from the shared cache device in response to receiving the found response.

Example 53 includes the subject matter of Example 52, and wherein the means for registering with the shared cache device comprises: means for sending a registration request to the shared cache device in response to scanning for the shared cache device; and means for receiving an approval from the shared cache device in response to sending the registration request.

Example 54 includes the subject matter of any of Examples 52 and 53, and wherein the means for requesting the cached web resource from the shared cache device comprises means for sending a request indicative of the cached web resource and an origin of the cached web resource.

Example 55 includes the subject matter of any of Examples 52-54, and further comprising: means for receiving a no-permission response from the shared cache device in response to requesting the cached web resource, wherein the no-permission response indicates that the client device was not validated; and means for raising a web browser event in response to receiving the no-permission response.

Example 56 includes the subject matter of any of Examples 52-55, and further comprising: means for receiving a not-found response or an expired response from the shared cache device in response to requesting the cached web resource, wherein the not-found response indicates that the cached web resource was not found by the shared cache device and wherein the expired response indicates that the cached web resource is expired; and means for requesting a web resource corresponding to the cached web resource from a remote web server in response to receiving the not-found response or the expired response.

Example 57 includes the subject matter of any of Examples 52-56, and further comprising: means for determining whether validation of the cached web resource is required in response to receiving the cached web resource; means for sending a request to a remote web server to validate that the cached web resource has not been modified in response to determining that validation of the cached web resource is required; means for receiving a response from the remote web server; means for determining whether the cached web resource has been modified based on the response from the remote web server; and means for sending a message to the shared cache device indicating that the cached web resource has been modified in response to determining that the cached web resource has been modified.

Example 58 includes the subject matter of any of Examples 52-57, and wherein the means for receiving the cached web resource comprises means for receiving metadata associated with the cached web resource, wherein the metadata is indicative of whether validation of the cached web resource is required.

Example 59 includes the subject matter of any of Examples 52-58, and further comprising: means for determining whether a web resource is designated as cacheable; wherein the means for requesting the cached web resource from the shared cache device comprises means for requesting a cached web resource corresponding to the web resource from the shared cache device in response to determining that the web resource is designated as cacheable.

Example 60 includes the subject matter of any of Examples 52-59, and wherein the means for determining whether the web resource is designated as cacheable comprises means for determining whether an element of a hypertext document designates the web resource as cacheable.

Example 61 includes the subject matter of any of Examples 52-60, and wherein the means for determining whether the web resource is designated as cacheable comprises means for receiving a web application programming interface command that designates the web resource as cacheable.

Example 62 includes the subject matter of any of Examples 52-61, and wherein the web application programming interface command comprises a web scripting environment command.

Example 63 includes the subject matter of any of Examples 52-62, and wherein the means for scanning for the shared cache device in local proximity to the computing device comprises means for scanning a local network for the shared cache device.

Example 64 includes the subject matter of any of Examples 52-63, and wherein the means for scanning for the shared cache device in local proximity to the computing device comprises means for scanning via a short-range communication protocol.

Example 65 includes a computing device for shared cache access, the computing device comprising: means for registering a client device with the computing device; means for storing authentication credentials associated with the client device in response to registering the client device; means for receiving a request for a cached web resource from the client device in response to storing the authentication credentials, wherein the request is associated with an origin of the cached web resource; means for determining whether a cached web resource associated with an origin that matches the request is installed in a shared cache of the computing device in response to receiving the request for the cached web resource; means for sending a found response to the client device in response to determining that the cached web resource associated with the origin that matches the request is installed in the shared cache; and means for sending the cached web resource to the client device in response to sending the found response.

Example 66 includes the subject matter of Example 65, and wherein the means for registering the client device with the computing device comprises: means for receiving a request to register a client device; means for verifying the client device in response to receiving the request to register the client device; and means for sending an approval to the client device in response to verifying the client device.

Example 67 includes the subject matter of any of Examples 65 and 66, and further comprising means for sending a not-found response to the client device in response to determining that the cached web resource associated with the origin that matches the request is not installed in the shared cache.

Example 68 includes the subject matter of any of Examples 65-67, and further comprising: means for determining whether the client device is validated in response to receiving the request for the cached web resource; and means for sending a no-permission response to the client device in response to determining that the client device is not validated.

Example 69 includes the subject matter of any of Examples 65-68, and further comprising: means for determining whether the cached web resource is expired in response to determining that the cached web resource associated with the origin that matches the request is installed in the shared cache; means for sending an expired response to the client device in response to determining that the cached web resource is expired; and means for removing the cached web resource from the shared cache in response to determining that the cached web resource is expired; wherein the means for sending the found response further comprises means for sending the found response to the client device in response to determining that the shared web resource is not expired.

Example 70 includes the subject matter of any of Examples 65-69, and further comprising: means for downloading a web resource from a remote web server, wherein the web resource is associated with an origin; means for determining whether the web resource is designated as cacheable in response to downloading the web resource; and means for installing the web resource in the shared cache as the cached web resource in response to determining that the web resource is designated as cacheable, wherein the cached web resource is indicative of the origin associated with the web resource.

Example 71 includes the subject matter of any of Examples 65-70, and wherein the means for determining whether the web resource is designated as cacheable comprises means for determining whether an element of a hypertext document designates the web resource as cacheable.

Example 72 includes the subject matter of any of Examples 65-71, and wherein the means for determining whether the web resource is designated as cacheable comprises means for receiving a web application programming interface command that designates the web resource as cacheable.

Example 73 includes the subject matter of any of Examples 65-72, and further comprising: means for determining whether the web resource is designated as requiring validation in response to downloading the web resource; wherein the means for sending the cached web resource comprises means for sending metadata associated with the cached web resource, wherein the metadata indicates that the cached web resource requires validation in response to determining that the web resource is designated as requiring validation.

Example 74 includes the subject matter of any of Examples 65-73, and further comprising: means for receiving a message from the client device indicating that the cached web resource has been modified in response to sending the found response; and means for removing the cached web resource from the shared cache in response to receiving the message from the client device.

Example 75 includes the subject matter of any of Examples 65-74, and wherein the means for installing the web resource in the shared cache comprises means for evicting an older cached web resource from the shared cache.

The invention claimed is:

1. A computing device for shared cache access, the computing device comprising:
a registration agent, implemented with hardware or at least one processor, the registration agent to (i) scan for a shared cache device local to the computing device, (ii) register with the shared cache device identified based on the scan, and (iii) store authentication credentials associated with the shared cache device in response to registration with the shared cache device; and
a browser cache agent, implemented with hardware or the at least one processor, the browser cache agent to (i) request a cached web resource from the shared cache device in response to storage of the authentication credentials associated with the shared cache device, (ii) determine, based on a found response from the shared cache device, that the shared cache device found the cached web resource, (iii) receive the cached web resource from the shared cache device, (iv) determine validation of the cached web resource is required in response to receipt of the cached web resource, (v) generate a request to be sent to a remote web server, the request to validate the cached web resource has not been modified, (vi) determine whether the cached web resource has been modified based on a response from the remote web server, and (vii) generate a message indicating that the cached web resource has been modified in response to a determination that the cached web resource has been modified, the message to be sent to the shared cache device.

2. The computing device of claim 1, wherein the request for the cached web resource is to indicate the cached web resource and to identify an origin of the cached web resource.

3. The computing device of claim 1, wherein the browser cache agent is further to request a web resource corresponding to the cached web resource from a remote web server in response to receipt of a not-found response or an expired response from the shared cache device.

4. The computing device of claim 1, wherein the browser cache agent is to determine whether a web resource is designated as cacheable, and the request for the cached web resource is generated in response to a determination that the web resource is designated as cacheable.

5. The computing device of claim 1, wherein the scan for the shared cache device local to the computing device includes a scan of a local network.

6. The computing device of claim 1, wherein the scan for the shared cache device local to the computing device is to be performed via a short-range communication protocol.

7. One or more computer-readable storage devices comprising instructions that, in response to being executed, cause a computing device to at least:
scan for a shared cache device local to the computing device;
register with the shared cache device in response to locating the shared cache device via the scan;
store authentication credentials associated with the shared cache device in response to registering with the shared cache device;
request a cached web resource from the shared cache device;
responsive to a found response from the shared cache device, wherein the found response indicates that the cached web resource was found by the shared cache device, receive access to the cached web resource from the shared cache device;
determine whether validation of the cached web resource is required in response to receiving the cached web resource;
generate a request to be sent to a remote web server to validate that the cached web resource has not been modified in response to determining that validation of the cached web resource is required;
determine the cached web resource has been modified based on a response from the remote web server; and
generate a message for the shared cache device, the message to indicate the cached web resource has been modified.

8. The one or more computer-readable storage devices of claim 7, wherein the request for the cached web resource from the shared cache device indicates an origin of the cached web resource.

9. The one or more computer-readable storage devices of claim 7, wherein the instructions, when executed, cause the computing device to request a web resource corresponding to the cached web resource from a remote web server responsive to a not-found response or an expired response, the not-found response to indicate the cached web resource was not found by the shared cache device and the expired response to indicate the cached web resource is expired.

10. The one or more computer-readable storage devices of claim 7, wherein the scan for the shared cache device local to the computing device is performed on a local network.

11. The one or more computer-readable storage devices of claim 7, wherein the scan for the shared cache device local to the computing device is performed via a short-range communication protocol.

12. A computing device for shared cache access, the computing device comprising:
a registration agent, implemented with hardware or at least one processor, the registration agent to (i) register a client device with the computing device and (ii) store authentication credentials associated with the client device in response to registration of the client device; and
a shared cache agent implemented with hardware or the at least one processor, the shared cache agent to (i) receive a request for a cached web resource from the client device in response to storage of the authentication credentials, the request to identify the cached web resource being requested and to include an origin of the cached web resource being requested, (ii) determine whether the cached web resource being requested is installed in a shared cache of the computing device and is associated with the same origin, (iii) generate a found response to be sent to the client device in response to a determination that the cached web resource associated with the same origin is installed in the shared cache, and (iv) send the cached web resource to the client device.

13. The computing device of claim 12, wherein the shared cache agent is further to:

determine whether the client device is validated in response to receipt of the request for the cached web resource; and generate a no-permission response to be sent to the client device in response to a determination that the client device is not validated.

14. The computing device of claim 12, wherein the shared cache agent is further to:

determine whether the cached web resource is expired in response to the determination that the cached web resource is installed in the shared cache;

generate an expired response to the client device in response to a determination that the cached web resource is expired; and remove the cached web resource from the shared cache in response to the determination that the cached web resource is expired; and wherein the found response is generated in response to a determination that the shared web resource is not expired.

15. The computing device of claim 12, further including a browser cache agent to:

download a web resource from a remote web server, the web resource associated with the origin;

determine whether the downloaded web resource is designated as cacheable; and install the web resource in the shared cache for use as the cached web resource in response to a determination that the web resource is designated as cacheable, the cached web resource indicative of the origin associated with the web resource.

16. The computing device of claim 15, wherein the determination as to whether the web resource is designated as cacheable includes a determination as to whether an element of a hypertext document designates the web resource as cacheable.

17. The computing device of claim 15, wherein the web resource is designated as cacheable by a web application programming interface command.

18. The computing device of claim 15, wherein the shared cache agent is to determine whether the web resource is designated as requiring validation in response to the download of the web resource; and wherein the cached web resource is to be sent with metadata associated with the cached web resource, the metadata to indicate that the cached web resource requires validation in response to a determination that the web resource is designated as requiring validation.

19. One or more computer-readable storage devices comprising instructions that, when executed, cause a computing device to at least:

register a client device with the computing device;

store authentication credentials associated with the client device in response to registering the client device;

determine whether a web resource included in a request from the client device is installed in a shared cache of the computing device, the request to identify the web resource being requested and to include an origin of the web resource being requested;

generate a found response to be sent to the client device in response to determining the web resource being requested is installed in the shared cache and the web resource installed in the shared cache has a same origin as the web resource being requested; and send the web resource to the client device.

20. The one or more computer-readable storage devices of claim 14, wherein the instructions, when executed, cause the computing device to:

determine whether the client device is validated in response to receiving the request for the web resource; and generate a no-permission response to be sent to the client device in response to a determination that the client device is not validated.

21. The one or more computer-readable storage devices of claim 19, wherein the instructions, when executed, cause the computing device to:

download the web resource from a remote web server, the web resource associated with the origin;

determine whether the web resource is designated as cacheable in response to downloading the web resource; and install the web resource in the shared cache for use as a cached web resource in response to determining that the web resource is designated as cacheable, the cached web resource including information identifying the origin of the web resource.

22. The one or more computer-readable storage devices of claim 21, wherein an element of a hypertext document designates the web resource as cacheable.

23. The one or more computer-readable storage devices of claim 21, wherein a web application programming interface command designates the web resource as cacheable.

* * * * *